Aug. 3, 1954   F. D. WERNER   2,685,470
NOISE ELIMINATING DEVICE FOR AUTOMOBILE WINDOWS
Filed Sept. 17, 1952
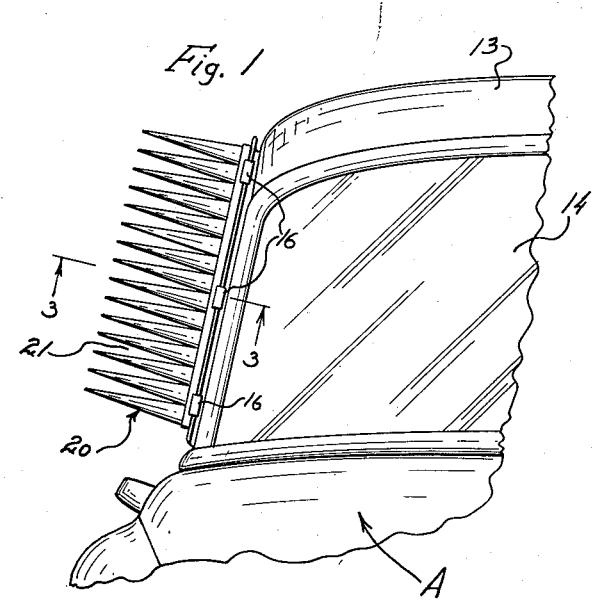
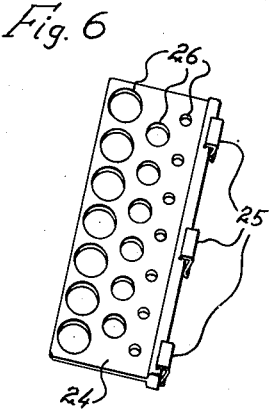
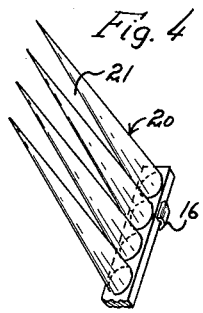
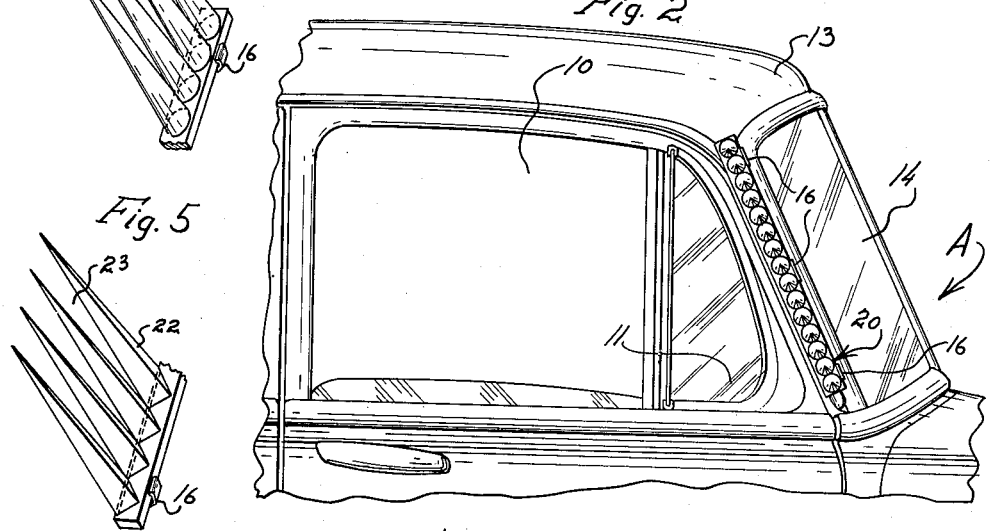
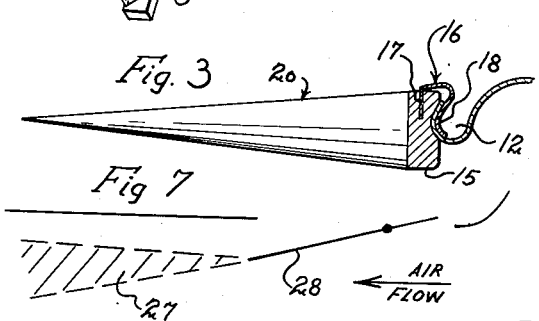
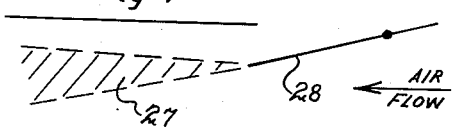
INVENTOR
FRANK D. WERNER

Patented Aug. 3, 1954

2,685,470

UNITED STATES PATENT OFFICE 2,685,470

NOISE ELIMINATING DEVICE FOR
AUTOMOBILE WINDOWS

Frank D. Werner, Rosemount, Minn.

Application September 17, 1952, Serial No. 310,056

10 Claims. (Cl. 296—44)

This invention relates to devices for eliminating noises which make conversation in an automobile extremely difficult when the windows of the automobile are open. More particularly, it relates to devices for eliminating or at least reducing to a non-objectionable amount, the noises caused by air rushing past the open window of an automobile when driven at high speeds.

Automobile driving during the warm months is normally less enjoyable than it might be because of the large amount of noise created by the air rushing past the open window of the automobile. This noise makes it extremely difficult to converse freely because the riders are unable to hear each other distinctly over these noises. My invention is directed toward eliminating these noises so that the occupants of the automobile may carry on a conversation in a normal tone of voice even though the windows are open. The need for such a device is especially acute in conjunction with the type of windows known as ventilator windows which are small windows pivoted on a vertical axis adjacent the windshield of the automobile and on either side thereof.

It is a general object of my invention to provide a novel device for eliminating the noise normally created by air rushing past an open window of an automobile, which makes conversation within the automobile difficult.

A more specific object is to provide a novel device for eliminating the normally sharp differentiation in velocities between the air in the turbulent zone behind a partly open ventilator window and the air immediately adjacent to this zone to thereby eliminate the noises which would otherwise be created by such a differential.

Another object is to provide a device for attachment to an automobile in a simple and ready manner which will eliminate the noises which hinder conversation and are normally caused by a partly open ventilator window.

Another object is to provide a device for attachment to the body of an automobile ahead of a partly open ventilator window which will vary the differential in velocities between the air passing adjacent to the turbulent zone behind the window and the air within the turbulent zone so as to eliminate the noises which would otherwise be created by such differential.

These and other objects and advantages of my invention will more fully appear from the following description, made in connection with the accompanying drawings, wherein like reference characters refer to the same or similar parts throughout the several views, and in which:

Fig. 1 is a partial front elevational view of an automobile with one embodiment of my invention attached thereto in operating position;

Fig. 2 is a partial side elevational view of the same;

Fig. 3 is a sectional view taken approximately along line 3—3 of Fig. 1 and showing in detail the manner of attachment to the automobile;

Fig. 4 is a perspective view of a portion of one embodiment of my device as disclosed in Figs. 1-3;

Fig. 5 is a perspective view of a portion of a second embodiment of my invention;

Fig. 6 is a front elevational view of a third embodiment of my invention; and

Fig. 7 is a diagrammatic view showing the turbulent zone normally created by a partially open ventilator window in the area therebehind.

One embodiment of my invention is shown in Figs. 1-3 attached to an automobile indicated generally as A. As shown, this automobile has a side window 10 and a ventilator window 11. It also has a rain gutter 12 which extends downwardly from the top 13 of the automobile alongside the windshield 14 of the same. As shown, this particular embodiment of my invention is attached to the rain gutter 12.

As shown in Figs. 1-4, one embodiment of my invention may include an elongated, at least semi-rigid body 15 which is adapted to be secured in a longitudinally upright position and extending along the side of the automobile by a spring clip member 16. As best shown in Fig. 1, this clip member has an end portion 17 which engages the semi-rigid body 15 and has its other end portion 18 bent to conform to the interior of the rain gutter 12 and to engage the same. A plurality of these clips 16, as shown in Fig. 1, readily serves to attach the elongated semi-rigid body 15 thereto in a fixed position. The clip 16 may, if desired, be a part of the material of the body 15.

Extending outwardly and laterally from the semi-rigid body 15 is a plurality of projections or fingers indicated generally as 20. As best shown in Figs. 1, 3 and 4, these projections 20 are very close together adjacent the semi-rigid body 15 and may even join. They taper, however, as they progress outwardly toward their outermost portions so that the spaces 21 thereinbetween increase gradually along their length as you progress outwardly. These spaces 21 actually become air passages when the device is in use so that the amount of air which is permitted to pass between these projections increases gradually as you progress laterally along the projections or fingers away from the window of the automobile.

These projections or fingers 20 may be conical in form as shown in Figs. 1–4 so that they are circular in cross-sectional shape, or they may be triangular in cross-sectional shape as shown by the projections 22 in Fig. 5 or of other cross-sectional shape. The important characteristic of each of these forms is that the amount of air which is permitted to pass between the passages 21 and 23 increases gradually as you move outwardly from the open window of the automobile.

Fig. 6 shows a third embodiment of the invention wherein the elongated and flat semi-rigid body 24 corresponds to a combination of the body 15 and the fingers 20 and 22. This flat elongated body 24 is provided with similar clips 25 and is mounted upon the side of the automobile in a similar manner. The air passages are provided by a plurality of apertures 26 these apertures increasing in diameter as you move outwardly away from the portions of the body 24 which are secured by the clips 25 to the automobile. It is readily apparent that the amount of air permitted to pass through these apertures increases gradually as you progress outwardly from the automobile. These apertures may be of any desired shape.

Fig. 7 displays diagrammatically the turbulent zone indicated as 27 which results from a partly open ventilator window 28 when the automobile is driven at high speed. An important part of the noise which is created by driving the automobile at high speed is a result of the differential in velocities between the air within this turbulent zone 27 and the air in the area immediately adjacent to this zone. It is known that the greater the differential between the velocities of the air within the zone 27 and the air immediately outside this zone, the greater is the amount of noise which will be created. The theory of my device is to create a relatively thick boundary layer of air so that the rate of change of the velocity differential is decreased and hence the noise is eliminated or reduced so greatly that for practical purposes it has been eliminated. Since the air which is permitted to pass through the air passages 21, 23 and 26 increases in volume as you move outwardly from the automobile, there is created a relatively thick boundary layer of air in the wake of these devices which has no sharp differential of velocity therewithin. As a result there is no sharp differential in the velocities between the air within the turbulent zone 27 and the air immediately adjacent to this zone. Because there is no sharp differential in velocities an insignificant amount of noise is created and hence the occupants of the automobile may converse in normal tones with ease.

It should be noted that I have provided a device which eliminates a troublesome source of noise in contrast to other devices which have been used adjacent windows of buildings, etc. which serve merely to redirect the noises so that they will not enter the room. In other words, I have provided a device which eliminates the source of sound rather than redirects the externally transmitted noise which might be transmitted through the window.

Although it is true that while the generation of noises immediately outside the window is eliminated by my device, a new noise source is provided by the fingers 20 and 22. At the higher speeds, however, if the cones are of small diameter a major part of the noise generated by the cones will not be within the frequency limits of audibility. It should be noted that this new noise source is much farther from the occupant's ear than the window noises and therefore there are substantially no noises observant in the automobile by the occupant.

Thus it can be readily seen that I have provided a novel device which may be simply and readily attached to an automobile in position so that it will substantially eliminate the noises normally caused by air rushing past an open window of an automobile when the latter is driven at high speeds. As a result, the occupants of the automobile are free to converse in normal tones and enjoy their trip to a much greater extent than has been previously possible It will of course be understood that various changes may be made in the form, details, arrangement, and proportions of the parts without departing from the scope of my invention.

What is claimed is:

1. A device for eliminating the noise normally caused by air rushing past the open window of an automobile, said device comprising an elongated, at least semi-rigid body having portions thereof adapted to be secured in longitudinal upright position to the body of the automobile ahead of such an open window and having other portions thereof extending outwardly and laterally from said first mentioned portions and relative to the window of the automobile when said body is so mounted, said laterally extending portions having a plurality of air passages of unequal diameter formed therethrough, the diameter of such air passages adjacent said securing portions being relatively small and the remainder of said passages being disposed outwardly of an adjacent to said relatively small passages and being of larger diameter so that the amount of air permitted to pass through said body and alongside the window will be increasingly greater outwardly from such window whereby the sharp differential between the velocity of the air moving past the window and the air within the automobile will be substantially diminished and hence less noise will be created.

2. A device for eliminating the noise normally caused by air rushing past the open window of an automobile, said device comprising the combination of an elongated, at least semi-rigid body adapted to be secured in longitudinal upright position to the body of the automobile ahead of such an open window, means for securing said body in such position, and a plurality of at least semi-rigid projections mounted on said body and extending laterally therefrom and of the window of the automobile when said body is so mounted, the outer end portions of said projections being spaced from each other more widely than the inner end portions thereof so that the amount of air permitted to pass outside the window will gradually increase outwardly and laterally from the window whereby the sharp differences in velocity between adjacent stratums of air in the vertical planes in the vicinity of the window will be caused to be reduced and hence less noise will be created.

3. A device for eliminating the noise normally caused by air rushing past the open window of an automobile, said device comprising an elongated, at least semi-rigid body, means for securing said body in longitudinal upright position to the body of the automobile ahead of such an open window, and a plurality of at least semi-rigid finger-like projections mounted on said body and extending outwardly and laterally therefrom and of the window of the automobile when said body is so secured, said projections tapering inwardly toward their outermost ends and forming therebetween air passages which increase in dimensions toward the outermost end portions of said projections so that the amount of air permitted to pass therebetween will be increasingly and gradually larger outwardly and laterally from the window whereby the sharp differentiation between the velocity of air moving past the window and the air within the automobile is tempered and hence less noise will be created.

4. A device for eliminating the noise normally caused by air rushing past the open window of an automobile, said device comprising an elongated, at least semi-rigid body, means for securing said body in longitudinal upright position to the body of the automobile ahead of such a window, and a plurality of fingers mounted on said body and extending outwardly and laterally therefrom and of the window of the automobile when the body is so mounted, said fingers being reduced in diameter toward their outermost ends and forming air passages therebetween which increase in dimensions gradually from points adjacent said body toward the outer ends of said fingers so that a relatively thick boundary layer of air is formed in the wake of said fingers whereby the normally sharp differential between the velocity of the air moving past the window and the air within the automobile is distributed over a relatively broad horizontal area and hence less noise will be created.

5. The structure defined in claim 4, said fingers being substantially circular in cross-sectional shape.

6. The structure defined in claim 5, said fingers being substantially triangular in cross-sectional shape.

7. A device for eliminating the noise normally caused by air rushing past the open window of the automobile, said device comprising an elongated, at least semi-rigid body, said body having portions thereof adapted to be secured to the body of an automobile ahead of such an open window and having other portions extending outwardly and laterally from said first mentioned portions, means for securing said body in longitudinal upright position to the body of the automobile ahead of such an open window, said laterally extending portions having a plurality of apertures of unequal diameter formed therethrough, some of said apertures being more closely adjacent to said securing portions than others, the apertures more remotely adjacent to said securing portions being larger in diameter than those more closely adjacent thereto so that the volume of air permitted to pass through said body and alongside the window will be increasingly greater outwardly from the window whereby a relatively thick boundary layer of air immediately outside of the window will be formed in the wake of said apertures and the normally sharp differential between the velocity of the air moving past the window and the air within the automobile is tempered and distributed over a broad area and hence less noise is created.

8. A device for eliminating the noise normally caused by air rushing past the open window of an automobile, said device comprising an elongated, at least semi-rigid body, said body having securing portions adapted to be secured to the body of an automobile ahead of such an open window and having other portions extending outwardly and laterally from said securing portions, a clip engaging said securing portions and adapted to secure the same in a longitudinal upright position to the body of the automobile ahead of such an open window, said laterally extending portions having a plurality of air passages of unequal sizes formed therethrough and distributed uniformly transversely of said body, some of said apertures being more closely adjacent to said securing portions than others, the size of said air passages being increasingly larger outwardly from the portions of said body secured to the automobile toward its outermost portions so that a relatively thick boundary layer of air having a gradually increasing velocity is formed in the wake of said body whereby the normally sharp differential between the velocity of the air moving past the window and the air within the automobile is tempered and distributed over a relatively wide horizontal area and hence less noise is created.

9. The combination of an automobile having a window therein and a rain gutter extending downwardly from the top of the automobile ahead of such window, a clip adapted to engage the interior of said rain gutter by one of its end portions, an at least semi-rigid body having portions thereof engaged by the other end portion of said clip and secured by said clip to said gutter in longitudinal upright position ahead of said window, said body having other portions extending outwardly and laterally from said first mentioned portions and of the window of the automobile, said laterally extending portions having a plurality of air passages of unequal size formed therethrough, the size of such air passages being increasingly larger outwardly from the portions of said body secured to said clip toward its outermost portions whereby a relatively thick boundary layer of air gradually increasing in velocity outwardly from said window will be formed in the wake of said laterally extending portions so that the normally sharp differential between the velocity of the air moving past the window and the air within the automobile is distributed over a relatively wide horizontal area and less noise is created.

10. A device for eliminating the noise normally caused by air rushing past the open windows of an automobile, said device comprising an elongated at least semi-rigid body having portions thereof adapted to be secured in longitudinal upright position to the body of the automobile ahead of such an open window and having other portions thereof extending outwardly and laterally from said first mentioned portions and relative to the window of the automobile when said body is so mounted, said last mentioned portions having a plurality of air passages extending therebetween and decreasing progressively in size adjacent said securing portions so that the amount of air permitted to pass through said body and alongside the window will be increasingly greater outwardly and laterally from said securing portions whereby the sharp differential in velocity existing between the air moving past the window and the air within the automobile will be substantially lessened and hence less noise will be created.

References Cited in the file of this patent

UNITED STATES PATENTS

| Number | Name | Date |
|---|---|---|
| 2,464,006 | Tiley | Mar. 8, 1949 |

FOREIGN PATENTS

| Number | Country | Date |
|---|---|---|
| 809,599 | Germany | Aug. 23, 1951 |
| 855,789 | France | May 20, 1940 |